(12) United States Patent  
Zhou et al.

(10) Patent No.: US 7,725,409 B2  
(45) Date of Patent: May 25, 2010

(54) GENE EXPRESSION PROGRAMMING BASED ON HIDDEN MARKOV MODELS

(75) Inventors: Chi Zhou, Vernon Hills, IL (US); Magdi A. Mohamed, Schaumburg, IL (US); Weimin Xiao, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 609 days.

(21) Appl. No.: 11/758,083

(22) Filed: Jun. 5, 2007

(65) Prior Publication Data

US 2008/0307399 A1   Dec. 11, 2008

(51) Int. Cl.
   *G06N 3/12*   (2006.01)
(52) U.S. Cl. .................................. 706/13; 704/256.1
(58) Field of Classification Search ................ 706/13; 704/256.1
   See application file for complete search history.

(56) References Cited

U.S. PATENT DOCUMENTS

2003/0177105 A1*  9/2003  Xiao et al. ................... 706/13
2006/0200436 A1   9/2006  Zhou et al.

FOREIGN PATENT DOCUMENTS

WO    WO9732261 A1    9/1997
WO    WO03081453 A1   10/2003

OTHER PUBLICATIONS

Ross, "Probabilistic Pattern Matching and the Evolution of Stochastic Regular Expressions," Applied Intelligence, vol. 13, No. 3 / Nov. 2000, pp. 285-300.*
Slimane et al. Optimizing Hidden Markov Models with a Genetic Algorithm. In Selected Papers From the European Conference on Artificial Evolution (Sep. 4-6, 1995). J. Alliot, E. Lutton, E. M. Ronald, M. Schoenauer, and D. Snyers, Eds. Lecture Notes In Computer Science, vol. 1063. Springer-Verlag, London, 385-396. 1996.*
Kyoung-Jae Won , Adam Prügel-Bennett , and Anders Krogh., "Training HMM structure with genetic algorithm for biological sequence analysis," Bioinformatics Advance Access published on Dec. 12, 2004, Bioinformatics 20: 3613-3619.*
Tu Van Le; Tran, D.; Wagner, M.; , "Fuzzy evolutionary programming for hidden Markov modelling in speaker identification," Evolutionary Computation, 1999. CEC 99. Proceedings of the 1999 Congress on , vol. 2, No., pp. 815 vol. 2, 1999.*
Candida Ferreira, "Gene Expression Programming: a New Adaptive Algorithm for Solving Problems," Complex Systems, vol. 13, No. 2, 2001, pp. 87-129.
J.R. Koza, "Genetic Programming," MIT Press, Cambridge, MA, 1992, pp. 73-76 and 79-82.

* cited by examiner

*Primary Examiner*—Donald Sparks
*Assistant Examiner*—David H Kim

(57) ABSTRACT

Computer programs (600, 700, 800, 900, 1000) and a programmed computer (1100) for automatically generating computer programs (i.e. sequences of instructions) are provided. The computer programs (600, 700, 800, 900, 1000) use Hidden Markov Models (400, 500) to generate sequences of program tokens, e.g., Gene Expression Programming chromosomes (100). Parameters of the Hidden Markov Models (400, 500) are numerically optimized, for example, by Differential Evolution with a goal of increasing the fitness of automatically generated programs.

15 Claims, 12 Drawing Sheets

[ sqrt.*.+.y.*.x.5.*.sqrt./.1.-.x.y.x.]

$$\sqrt{(y+5x)x\sqrt{\dfrac{1}{x-y}}}$$

400

GENE EXPRESSION PROGRAMMING BASED ON HIDDEN MARKOV MODELS

FIELD OF THE INVENTION

The present invention relates generally to machine learning.

BACKGROUND

Since the early days of the electronic computer, some of the most ambitious goals in computer science research were in the field of Artificial Intelligence. To date computer power has increased by many orders of magnitude (powers of ten). Utilizing the immense power of computers available today computer engineers are exploring various practical uses of computers within a sub-field of Artificial Intelligence known as Machine Learning. In Machine Learning a goal is to provide hardware and/or software that enables a computer to learn to perform particular task, such as distinguishing different spoken or handwritten words.

One sub-field of Machine Learning is Genetic Programming. A goal of Genetic Programming is to make a computer automatically generate a computer program (i.e. a sequence of instructions) to perform a particular task that uses the computer. In Genetic Programming, programs in successive generations of a population of programs being evolved are selected based on fitness to solve test cases of a particular problem and the selected programs are cross-bread and mutated to form each next generation.

One type of Genetic Programming is called Gene Expression Programming (GEP). In Gene Expression Programming the computer programs being evolved are represented by vectors of program tokens, called chromosomes. In the course of evolving a population of vector representations of programs various evolutionary operations such as one-point cross-over, two-point cross-over and mutation are performed. Gene Expression Programming is described in issued U.S. Pat. No. 7,127,436 to Weimin Xiao et al, in co-pending patent application publication Number US 2006-0200436 A1 by Chi Zhou et al., published Sep. 7, 2006 and in Candida Ferreira, "Gene Expression Programming: a New Adaptive Algorithm for Solving Problems," *Complex Systems*, Vol. 13, No. 2, pages 87-129, 2001.

In computer programming the order of execution of instructions is important. However, the evolutionary operations used in Gene Expression Programming are not particularly attuned to the importance of the order of execution in computer programs, or the importance of an instruction at a typical position in the execution sequence. For example a one-point cross-over operation exchanges a first part of a program encoded in a GEP chromosome with a last part of a program encoded in another GEP chromosome. Another negative aspect of GEP is that even using current high speed computers, even using highly parallel computers GEP software often requires very long run times, particularly for complex problems.

Thus, it is highly desired to have an improved GEP more suitable for automatically generating computer programs and requires less run time.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figures 1, 2, 3:
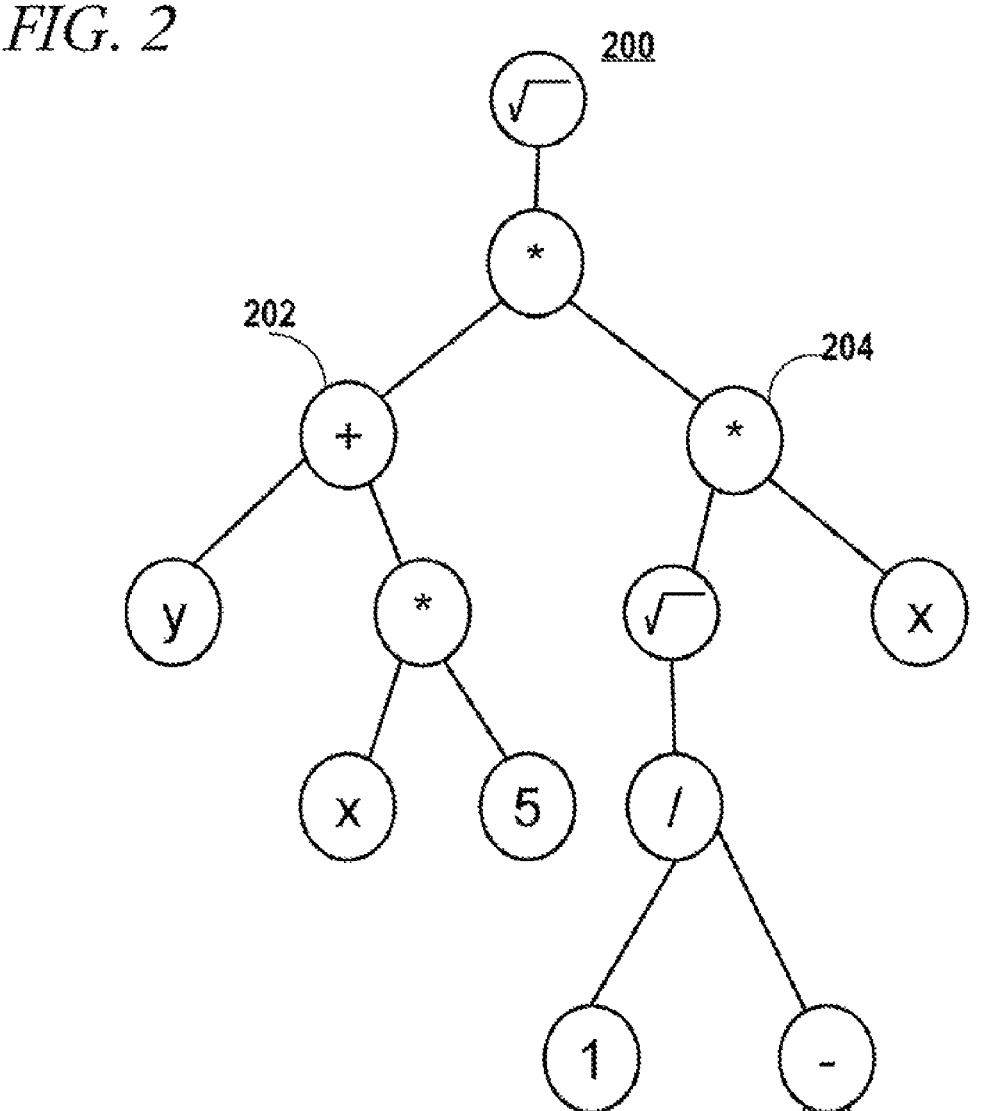
FIG. 1 is a Gene Expression Programming chromosome.
FIG. 2 is an expression tree representation of a program for evaluating a simple equation that is encoded in the chromosome shown in FIG. 1.
FIG. 3 shows an equation that the program encoded in the chromosome shown in FIG. 1 evaluates.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to machine learning. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of machine learning described herein. The non-processor circuits may include, but are not limited to signal drivers, clock circuits, power source circuits, and user input devices. As such, these functions may be interpreted as steps of a method to perform machine learning. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 shows a Gene Expression Programming chromosome 100. A Gene Expression Programming chromosome is a vector of program tokens. The program tokens can include elements of a computer language such as the arithmetic operators (+,−,*,/), logical operators (AND, OR, NOT), flow control commands such as (IF . . . THEN), fixed constants such (Pi, e, 1, 3, 2.4) and variables such as (time, cost, distance, weight, V, W), by way of non-limiting example. The program can be a program for evaluating a formula. Formulas are at the core of many types of practical computer programs, such as financial programs and technical programs. The programs generated automatically as described herein can be incorporated into larger programs that include hand-written parts. Using one or more IF . . . THEN constructs, a chromosome can encode more complex programs. Generally in Gene Expression Programming there are two ways to encode programs in chromosomes, depth-first or breadth-first.

Figure 11:
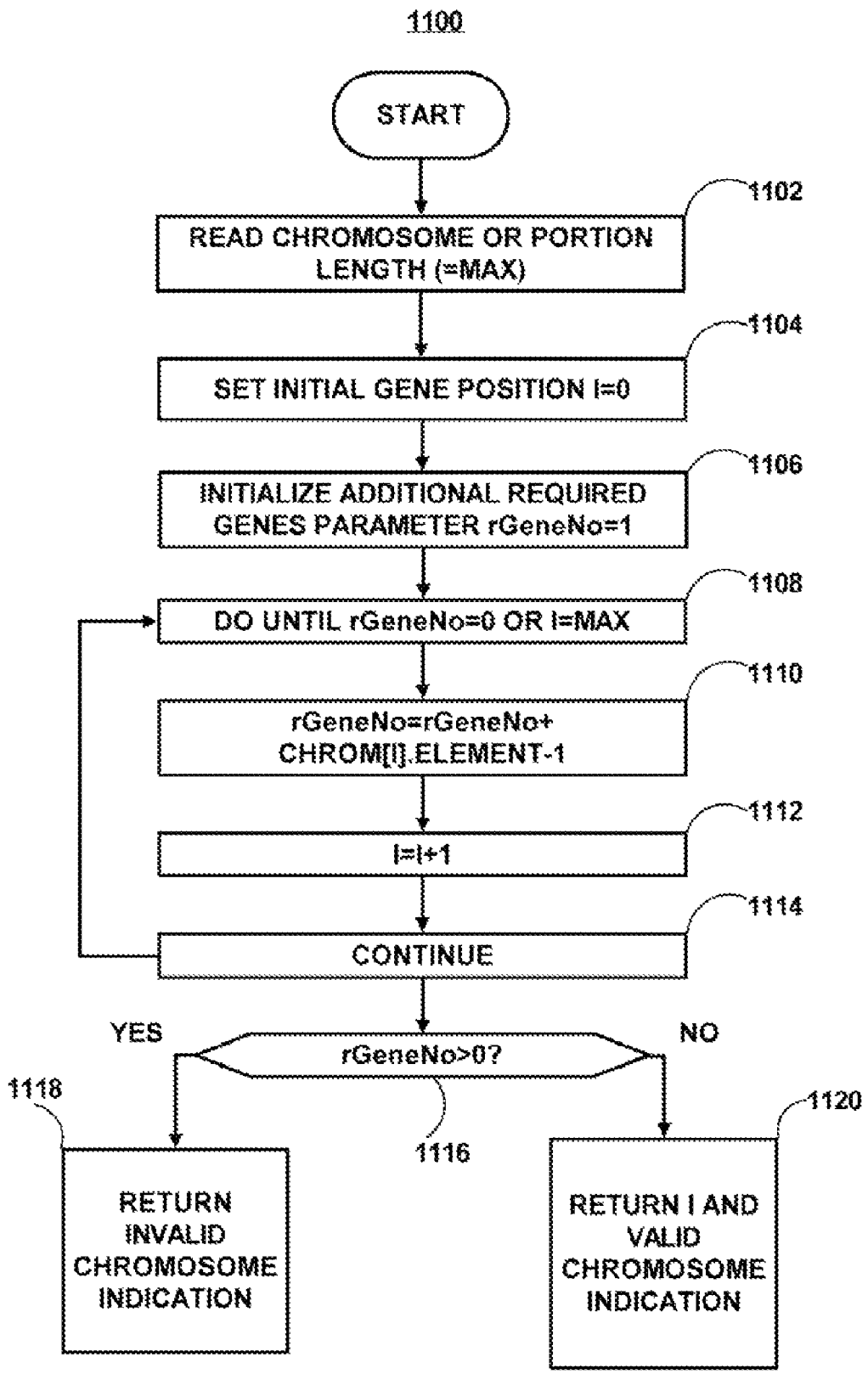
FIG. 11 is a flowchart of a sub-program for checking if Gene Expression Programming chromosomes encode a complete, valid program.
Figure 12:
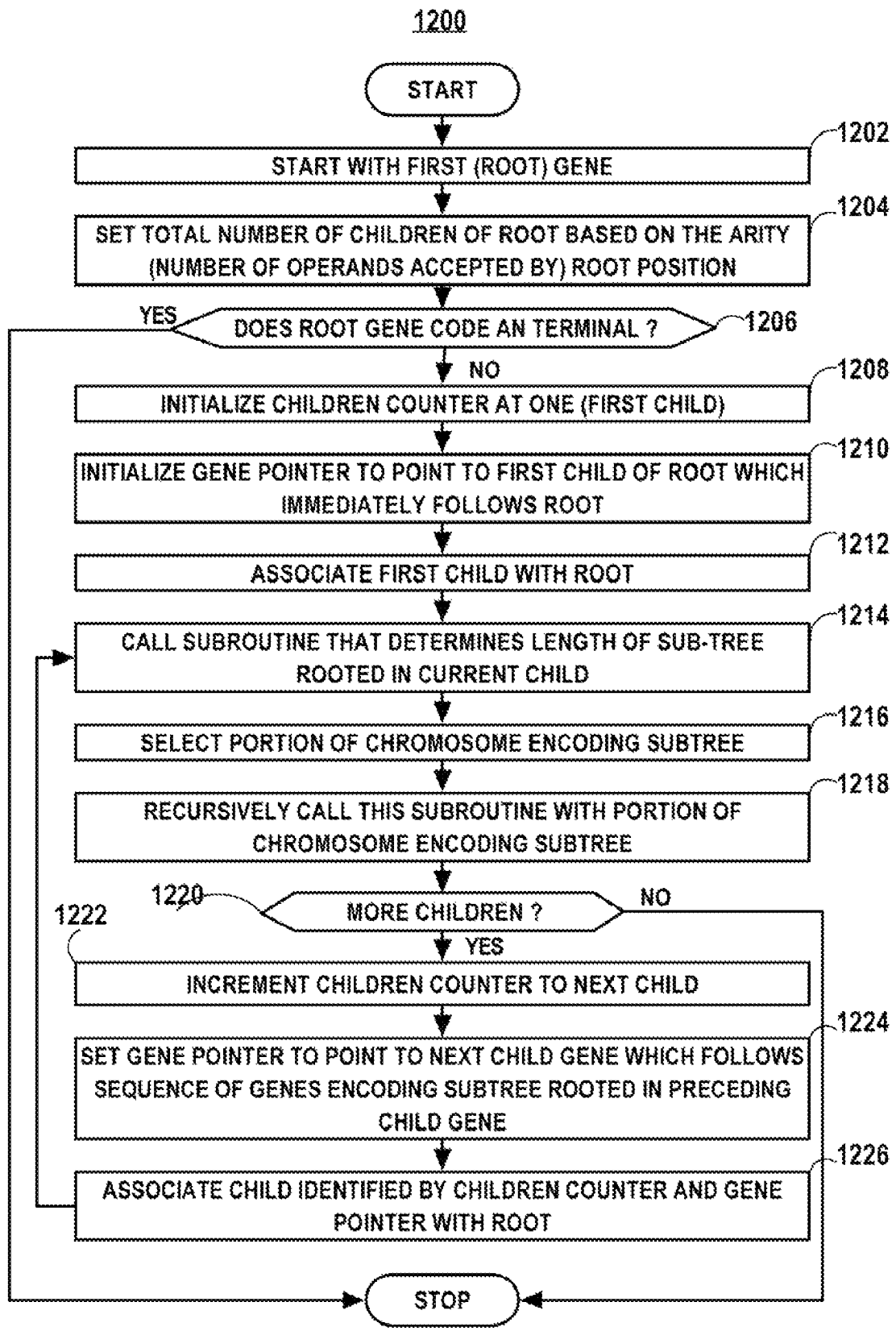
FIG. 12 is a flowchart of a sub-program for decoding chromosome arrays such as shown in FIG. 1.
Figure 13:
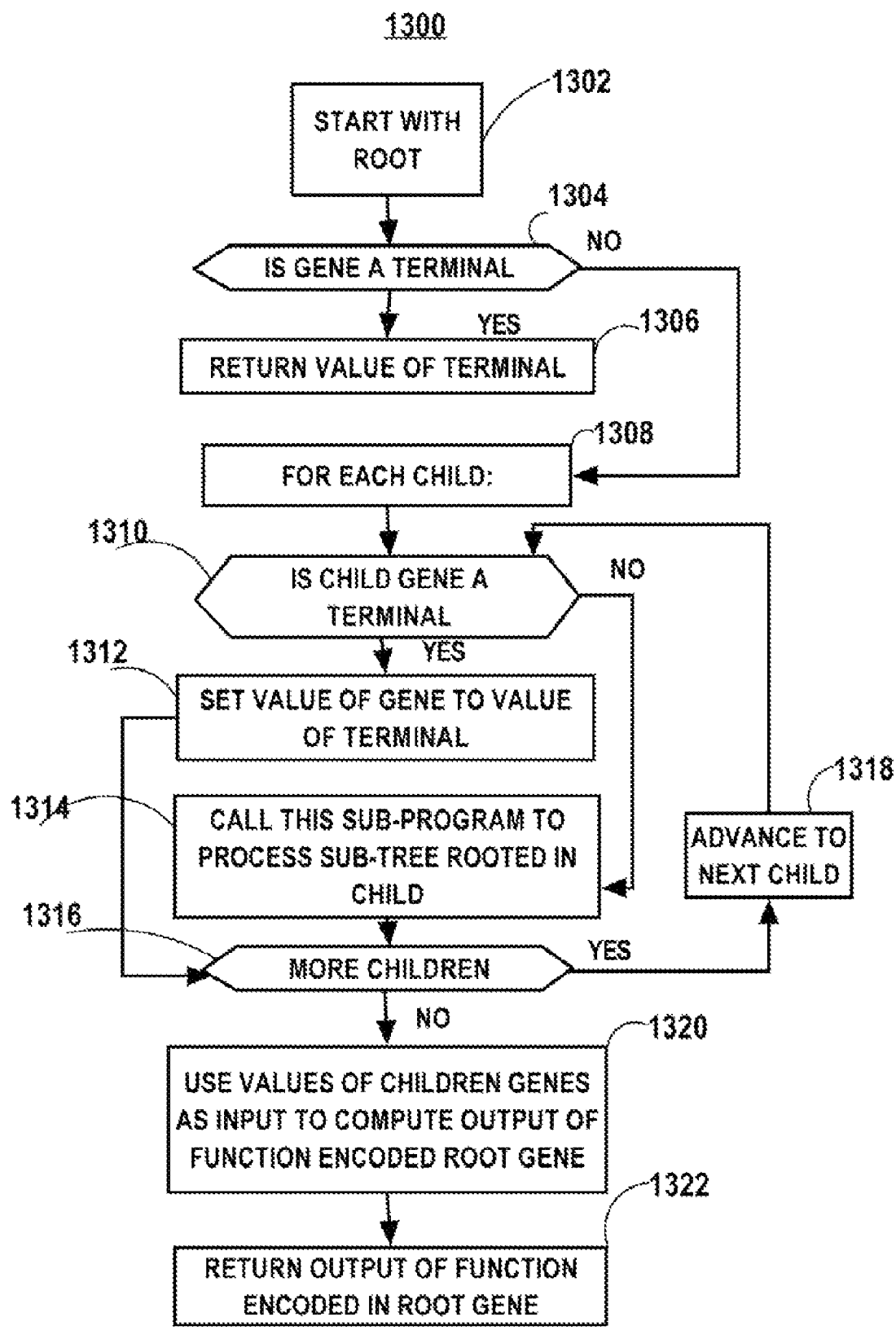
FIG. 13 is a flowchart of a sub-program for evaluating the output of a program encoded in a chromosome that is produced in response to input.

FIG. 2 is an expression tree 200 representation of a program for evaluating a simple equation that is encoded in the chromosome shown in FIG. 1. The program represented by the expression tree 200 is encoded in the chromosome in depth-first manner. Thus, for example all of the tokens representing the sub-tree rooted in + operator 202 appear in the chromosome 100 before any tokens in the sub-tree rooted in the * operator 204. FIG. 3 shows an equation 300 that the program encoded in the chromosome 100 shown in FIG. 1 evaluates. The chromosome 100 is effectively an interpretable, efficiently encoded computer program. Sub-programs used to interpret the chromosomes are shown in FIGS. 11-13 and described below. More complicated programs that can be encoded in Gene Expression Programming chromosomes are not simply closed form expression, but FIGS. 1-3 are presented for pedagogical purposes to illustrate how Gene Expression Program chromosome encoding works.

Programs can be generated using a variety of functions, operators, constants, variables and flow control construct tokens. It is appropriate for a wide variety of technical fields to include addition, subtraction, multiplication, and division among the operators. In a wide variety of technical fields it is also appropriate to include trigonometry functions such as sine, cosine, tangent, and inverse trigonometry functions such as arcsine, arccosine, and arctangent. Note that operators may be classified according to the number of arguments (e.g., operands) upon which they operate. Other types of functions may also be included. The MAX function accepts two operands or sub-programs that return values as arguments, evaluates the two arguments, and returns the value of the argument that is larger. The complementary MIN function may also be included.

A program token, representing the IF {subexpression_one>0} THEN {subexpression_two} ELSE {subexpression_three} (succinctly referred to as the IF operator), may also be used in generating programs. The latter is useful in discovering piecewise defined functions and in discovering mathematical expressions for classification. Note that the IF operator accepts three arguments, a first sub-expression used in an inequality condition, a second sub-expression to be evaluated if the condition is met, and a third sub-expression to be evaluated if the condition is not met.

It may be appropriate to include operators based on special functions that arise often in a specific field. For example in the field of Neural Networks, it may be appropriate to use an operator based on the Sigmoid function.

Table I includes an exemplary list of operators that may be used in automatically generated computer programs. In Table I, the first column indicates names of operators, the second column indicates operator type which is equivalent to the number of arguments that an operator accepts (the arity), the third column is reserved for values (which is dependent on the values of the arguments of each operators and therefore is not filled in in Table I), the fourth column gives a cost associated with each operator, the latter being a measure of computational cost associated with the operator, and the fifth column is an index by which the operator is referenced.

TABLE I

| NAME | TYPE | VALUE | COST | INDEX |
| --- | --- | --- | --- | --- |
| THREE OPERAND OPERATOR | | | | |
| IF | 3 | — | 3 | 1 |
| TWO OPERAND OPERATORS | | | | |
| + | 2 | — | 1 | 2 |
| − | 2 | — | 1 | 3 |
| * | 2 | — | 1 | 4 |
| / | 2 | — | 1 | 5 |
| MIN | 2 | — | 2 | 6 |
| MAX | 2 | — | 2 | 7 |
| POW | 2 | — | 2 | 8 |
| ONE OPERAND OPERATORS | | | | |
| SIN | 1 | — | 2 | 9 |
| COS | 1 | — | 2 | 10 |
| TAN | 1 | — | 2 | 11 |
| EXP | 1 | — | 2 | 12 |
| LOG | 1 | — | 2 | 13 |

TABLE I-continued

| NAME | TYPE | VALUE | COST | INDEX |
|---|---|---|---|---|
| SQRT | 1 | — | 2 | 14 |
| GAUSS | 1 | — | 2 | 15 |
| SIGMOID | 1 | — | 2 | 16 |

Table II below includes an exemplary list of operands that can be used in automatically generated programs. The identity of the columns in Table II is the same as in Table I. The index numbers in Table II continue the index number sequence started in Table I.

TABLE II

| NAME | TYPE | VALUE | COST | INDEX |
|---|---|---|---|---|
| OPERANDS | | | | |
| Pi | 0 | 3.1415 | 0 | 17 |
| 0 | 0 | 0.0 | 0 | 18 |
| 1 | 0 | 1.0 | 0 | 19 |
| PRIME NUMBER OPERANDS | | | | |
| 2 | 0 | 2.0 | 0 | 20 |
| 3 | 0 | 3.0 | 0 | 21 |
| 5 | 0 | 5.0 | 0 | 22 |
| 7 | 0 | 7.0 | 0 | 23 |
| 11 | 0 | 11.0 | 0 | 24 |
| 13 | 0 | 13.0 | 0 | 25 |
| 17 | 0 | 17.0 | 0 | 26 |
| 19 | 0 | 19.0 | 0 | 27 |
| 23 | 0 | 23.0 | 0 | 28 |
| 29 | 0 | 29.0 | 0 | 29 |
| 31 | 0 | 31.0 | 0 | 30 |
| 37 | 0 | 37.0 | 0 | 31 |
| 41 | 0 | 41.0 | 0 | 32 |
| 43 | 0 | 43.0 | 0 | 33 |
| 47 | 0 | 47.0 | 0 | 34 |
| 53 | 0 | 53.0 | 0 | 35 |
| 59 | 0 | 59.0 | 0 | 36 |
| 61 | 0 | 61.0 | 0 | 37 |
| 67 | 0 | 67.0 | 0 | 38 |
| 71 | 0 | 71.0 | 0 | 39 |
| 79 | 0 | 79.0 | 0 | 40 |
| 83 | 0 | 83.0 | 0 | 41 |
| 89 | 0 | 89.0 | 0 | 42 |
| RND_1 | 0 | ? | 0 | 43 |
| RND_n | 0 | ? | 0 | 44 |
| X | 0 | — | 0 | 45 |
| Y | 0 | — | 0 | 46 |

The first row (row 17 by index number) of Table II includes Pi which is included because experience has shown that it often appears in technical computer programs. Other appropriate constants that are significant in a wide range of fields (e.g., the natural logarithm base, e) or constants that are applicable to a particular field (e.g., Plank's constant) may be included in Table II if is thought there is a high likelihood that they appear in a program to be automatically generated. The following row (index 18) of Table II includes the zero operand. Inclusion of zero allows a Gene Expression Programming program to effectively turn off parts of program, e.g., by multiplying a sub expression by zero, without otherwise disturbing the program. According to an alternative embodiment the uno( ) function is included among the operators. The uno( ) function returns its argument unchanged.

The next row (index 19) of Table II includes the number one (1). One has a special role in the real number system in that any integer or rational number may be formed by summing one or dividing sums of one respectively. Thus including one, facilitates automatic identification of integer or rational constants.

The next group of rows (indexes 20-42) of Table II include a sequence of prime numbers. By combining two or more of the prime numbers in products, sums, quotients, and differences, a variety of numbers may be generated by sub-expressions that are relatively simple compared to what would be needed to generate the same numbers using only the number one. Thus, the inclusion of the sequence of prime numbers in Table II tends to reduce the number of generations required a Gene Expression Programming algorithm to find a mathematical expression that describes a set of technical data, or performs well as a classification rule and also tends to reduce the complexity of the mathematical expressions that are found.

The next two rows represent a sequence of random number generators RNG_1 to RNG_n. The values for RNG_1 to RNG_n can initially be set randomly but subsequently refined by optimization, for example by Differential Evolution.

The parameters for automatically generated programs may be identified in a file that includes training data that is used to evaluate the fitness of automatically generated programs. A standard file format that is used for training data and includes identifications of independent variables associated with the data is known as the Attribute Relation File Format or ARFF. The last two entries in Table II—X and Y are exemplary independent variables. The number of parameters in Table II corresponds to the number of independent variables in technical data in the ARFF if such training data is used. For certain problems, there may be only one independent variable or more than two. The operators and operands in Table I and II will serve as root genes that will be included in a population of chromosomes that is processed in the course of automatically generating programs.

Figure 4:
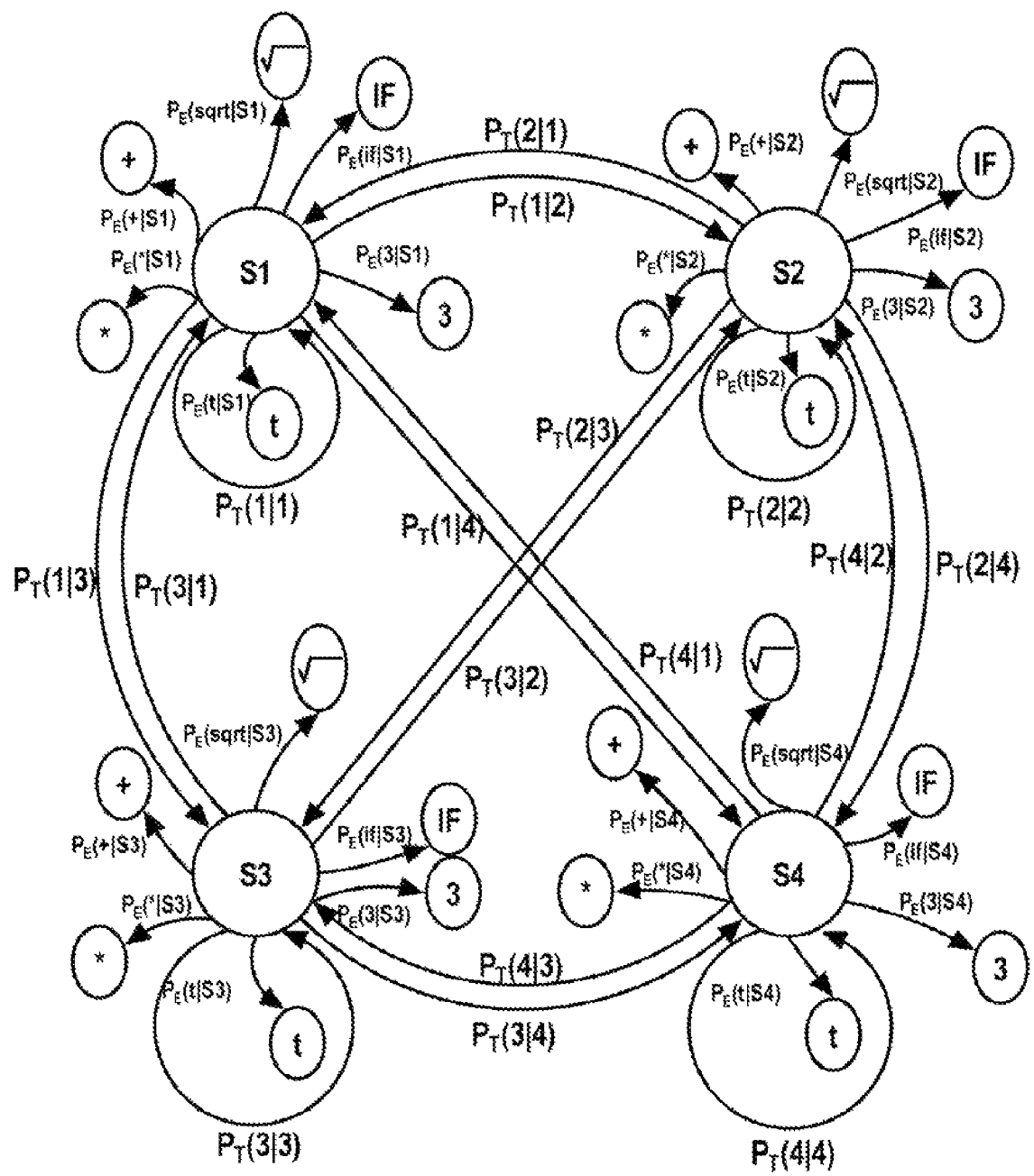
FIG. 4 is a diagram of a simple Hidden Markov Model for generating Gene Expression Programming chromosomes representing computer programs.

FIG. 4 is a diagram of a simple discrete Hidden Markov Model 400 for generating Gene Expression Programming chromosomes representing computer programs. The Hidden Markov Model 400 shown in FIG. 4 is somewhat simplified as to the numbers of emitted program tokens and states, in the interest of clarity. The Hidden Markov Model 400 includes four states S1, S2, S3, S4 each one is capable of emitting a number of program tokens including "+", "sqrt", "IF . . . THEN", "3", "t" and "*". The symbol "IF" represents the "IF . . . THEN" operator in FIG. 4. In operation, the HMM 400 transitions from state-to-state during successive cycles of operation. Transitions from state-to-state are governed by probabilities for each possible transition e.g. $S_I$ to $S_J$ including transitions from a state back to the same state i.e. $S_J$ to $S_J$. Arrows from state-to-state represent transitions from state-to-state in FIG. 4. Arrows looping back to the same state represent "transitions" back to the same state. The probability of transition from state $S_I$ to state $S_J$ is denoted $P_T(J|I)$ in FIG. 4 and herein below. Thus if there are N states there are $N^2$ possible transitions. The probability that the HMM will emit a particular program token when the HMM is in a particular state is denoted $P_E(T|S_J)$ where T represents a token and $S_J$ represents a $J^{TH}$ state. Additionally, although not represented graphically in FIG. 4 there are also probabilities that the HMM will start in each state $S_J$ which can be denoted $P_I(J)$. Thus assuming there are N states each of which can emit K different program tokens there are $N+N^2+NK$ probabilities that define a HMM. N is the number of initial state probabilities, $N^2$ is the number of state-to-state transition probabilities and NK is the number of program token emission probabilities.

The fact that a Hidden Markov Model like a computer program is sequential in nature may be responsible for the improved performance of programs described below for automatically generating computer programs using Hidden Markov Models. Notwithstanding the foregoing, the inventor does not wish to be bound by any theory of operation.

Figure 5:
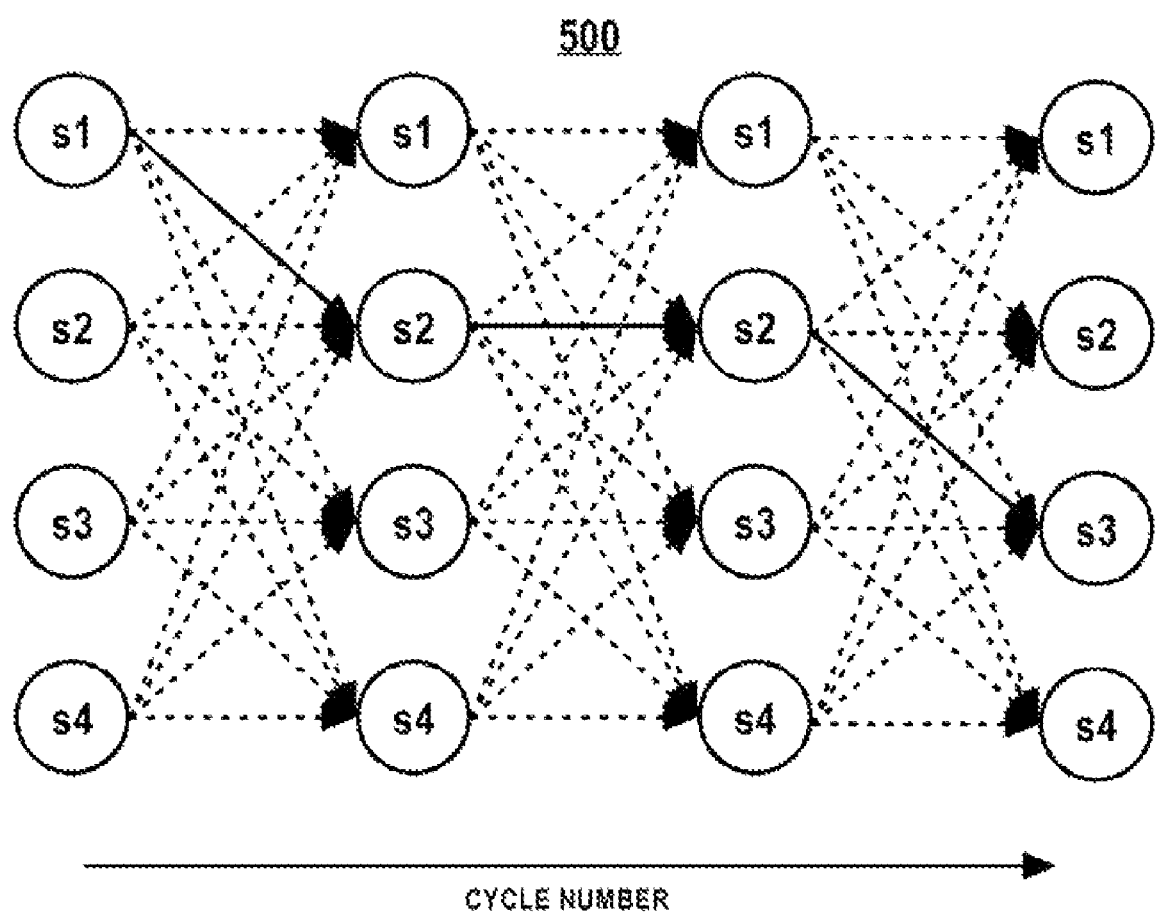
FIG. 5 is an alternative type of diagram of a Hidden Markov Model showing possible paths through sequential states.

FIG. 5 is an alternative type of diagram of a Hidden Markov Model 500 showing possible paths through sequential states. In FIG. 5 the states S1, S2, S3, S4 are shown duplicated four times for four cycles of operation of the HMM 500. All possible transitions are shown with arrows connecting states in successive cycles and one possible state sequence is marked with solid line arrows.

Figure 6:
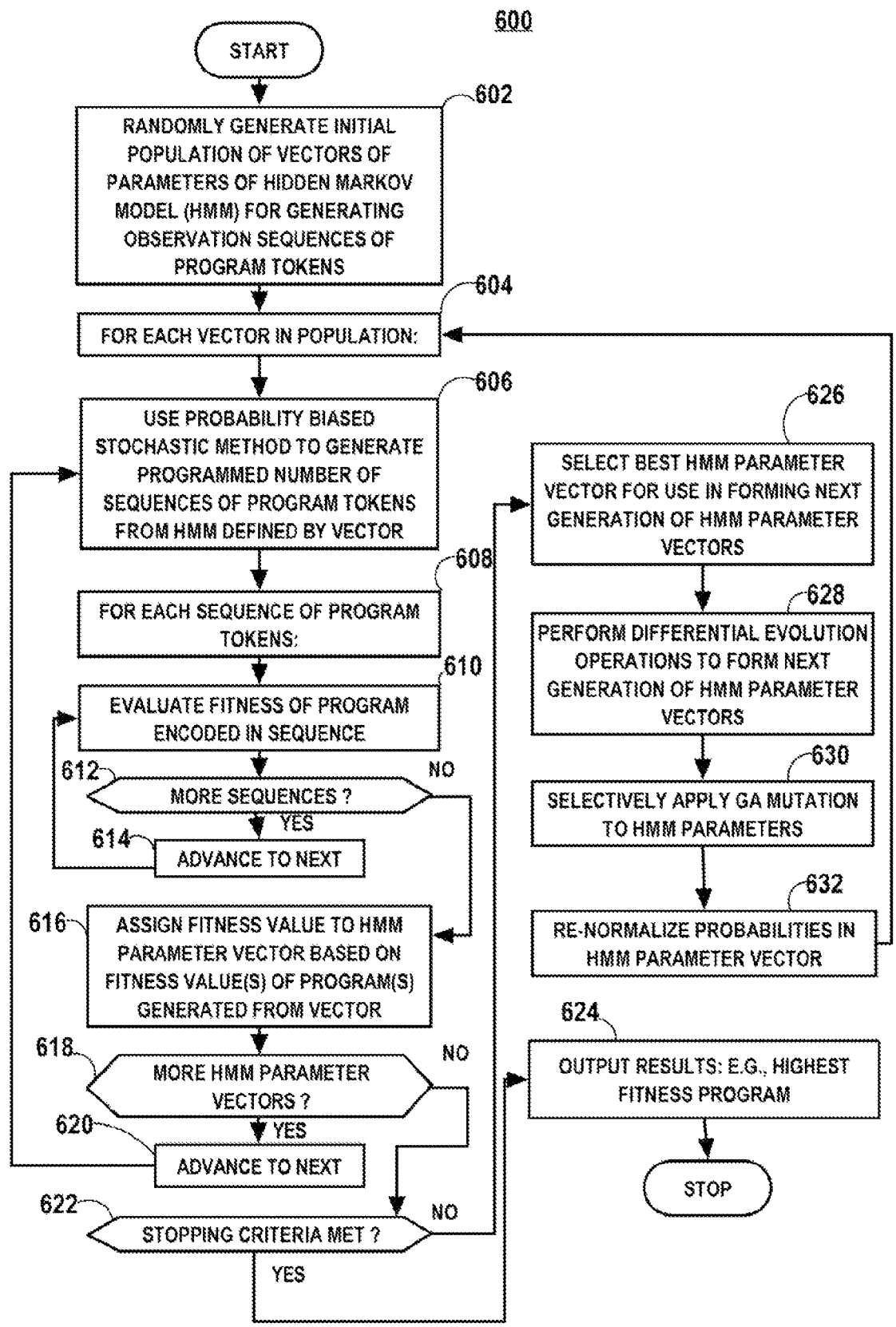
FIG. 6 is a flowchart of a first program that uses Differential Evolution to evolve parameters of a Hidden Markov Model for generating Gene Expression Programming chromosomes in order to automatically generate a computer program for a particular task.

FIG. 6 is a flowchart of a first program 600 that uses Differential Evolution to evolve parameters of a Hidden Markov Model ($P_I$, $P_T$, $P_E$) for generating Gene Expression Programming chromosomes in order to automatically generate a computer program for a particular task. Differential Evolution is a known Evolutionary Programming, non-linear, non-differentiable function optimization algorithm and is described in R. Storm, K Price, *Differential Evolution—A simple and efficient adaptive scheme for global optimization over continuous spaces*, Technical Report TR-95-012, ICSI, March 1995. In block 602 an initial Differential Evolution population is generated. The initial population (and subsequent generations of the population) includes multiple (e.g., 128) parameter vectors. Each parameter vector (a population member) is a vector of probabilities defining a Hidden Markov Model. Each vector includes the initial state probabilities $P_I(.)$, the state-to-state transition probabilities $P_T(.|.)$ and the program token emission probabilities $P_E(.|.)$ for the Hidden Markov Model. Thus, each parameter vector has at least $N+N^2+NK$ elements as discussed above. The probabilities in the initial population can be generated using a random number generator and then normalized such that the sum of the probabilities of all possible outcomes (e.g., the sum of the probabilities of transitions from a given state, the sum of the initial state probabilities, the sum of all possible program token emissions from a give state) is equal to unity.

Block 604 is the top of a loop that repeats for each vector in each generation of the population. In block 606 a probability biased stochastic method is used to generate a programmed number (e.g., 1024) of sequences of program tokens (chromosomes) from a HMM defined by a current vector of HMM parameters (DE population member). One particular probability biased stochastic method is described below with reference to FIG. 7.

Computer programs often involve constants. In order to automatically determine constants in the course of automatically generating programs, one or more constant names (RNG1, RNG2, etc) can be included as program tokens that can be emitted by the Hidden Markov Model and the size DE population members can be increased beyond $N+N^2+NK$ to include elements corresponding to the one or more constant names (RNG1, RNG2, etc).

Block 608 is the top of a loop (within the loop commenced in block 604) that processes each sequence of program tokens (chromosome) that is generated from an HMM defined by a parameter vector (DE population member). In block 610 the fitness of the program encoded in each chromosome is evaluated. Fitness can be judged using training data that includes examples of program input and associated known correct output. Fitness metrics can be based on the difference between the actual output of a particular program in response to training data input and the known correct output. The latter is termed performance related fitness.

The fitness can also be based in part on a parsimony related fitness metric. As disclosed in U.S. Pat. No. 7,127,436 to Xiao et al. a parsimony related fitness metric can be based on a sum of costs associated with individual program tokens, e.g.:

$$PC_j = \sum_{network} Cost_i \qquad \text{EQU. 1}$$

where, $PC_j$ stands for the cost of the $j^{th}$ program; and
$Cost_i$ is the cost of the $i^{th}$ program token in the $j^{th}$ program.

Cost for each program token may be assigned based on estimates of computational cost associated with each program token, for example a trigonometry function can be assigned a higher cost that an arithmetic function. The performance related fitness and the parsimony related fitness can be combined into an overall fitness metric such as:

$$F_j = (1-p) \cdot PF_j + p \cdot PC_j \qquad \text{EQU. 2}$$

where, $F_j$ is an overall measure of fitness of an $j^{th}$ program that is encoded in a $j^{th}$ chromosome;
$PF_j$ is the performance related fitness measure;
$PC_j$ is the parsimony related fitness measure; and
p is a parsimony weighting factor that determines the weight to be given to the parsimony related measure of fitness in the overall measure of fitness.

Decision block 612 tests if more program token sequences (chromosomes) remain to be processed. If so then in block 614 the program 600 is advanced to the next program token sequence and then loops back to block 610. If, on the other hand, no more program token sequences remain to be processed then the program 600 branches to block 616 in which a fitness value is assigned to a DE population member (HMM parameter vector) currently being processed. The fitness value assigned to the DE population member is based on one or more of the fitness values assigned to the program token sequences generated by the HMM configured by the DE population member. According to certain embodiments the HMM is assigned the fitness value of the highest fitness program token sequence generated by the HMM configured with the DE population member. According to alternative embodiments the HMM is assigned a fitness value based on, an average program fitness, or a statistical function of all the program fitness values, for example.

Next decision block 618 tests if there are more DE population members (HMM parameter vectors) to be processed. If so, in block 620 the program 600 advances to a next DE population member and then loops back to block 606. If, on the other hand, there are no more DE population members to be processed, the program 600 branches to decision block 622 which tests if a stopping criteria has been met. Various known stopping criteria, such as for example an iteration limit (DE generation limit), a comparison of a best achieved fitness to a pre-programmed fitness goal, and/or a test for continued generation-to-generation improvement can be used in block 622. If it is determined in block 622 that the stopping criteria has been met then the program 600 branches to block 624 in which results of the program 600 are output. The results that are output in block 624 can for example include a listing of a highest fitness program found by the program 600.

If, on the other hand, it is determined in block 622 that the stopping criteria has not been met then, the program 600 branches to block 626 in which the best DE population member (HMM parameter vector) is selected for use in forming a next generation of the DE population (HMM parameter vectors). Then in block 628 Differential Evolution operations are performed in order to form a next generation of the DE population. One form of D.E. mutation is expressed by the following formula:

$$X_i^{new} = X_{best} + f(X_j + X_k - X_l - X_m)$$ EQU. 3 where, $X_i^{new}$ is a new population member that replaces population member $X_i$ that has been selected for D.E. mutation;

$X_{best}$ is the population member that yielded the highest fitness;

$X_j$, $X_k$, $X_l$, $X_m$, are other population members (e.g., other population members selected at random; and f is a scalar factor that is suitably set to a value in the range of between 0.1 to two.

Next in block 630, another type of evolutionary operation—genetic algorithm (G.A.) mutation operation is selectively applied to HMM parameters. One form of G.A. mutation is expressed by the following formula:

$$x_i^{new} = x_i + (\text{rand} - 0.5)(0.1 x_i + eps)$$ EQU. 4 where, $x_i$ is a parameter being mutated $x_i^{new}$ is a mutated numerical value;

eps is a machine constant equal to the smallest number that can be represented in the floating point system of the machine Note that equation four illustrates a mutation limited to a maximum of plus or minus 5%. 5% is a reasonable limit for mutation but may be changed if desired.

Every numerical parameter is considered a candidate for applying G.A. mutation. In order to determine whether G.A. mutation is applied to each parameter, a random number between zero and one can be generated for each parameter compared to a preprogrammed G.A. mutation probability. If the random number is less than the preprogrammed G.A. probability then the parameter is mutated.

Next in block 632 the HMM parameter vectors are renormalized so that the sum of the probabilities of all possible probabilistic outcomes is equal to unity. After block 632 the program loops back to block 604 and proceeds executing as previously described with the newly created generation.

Figure 7:
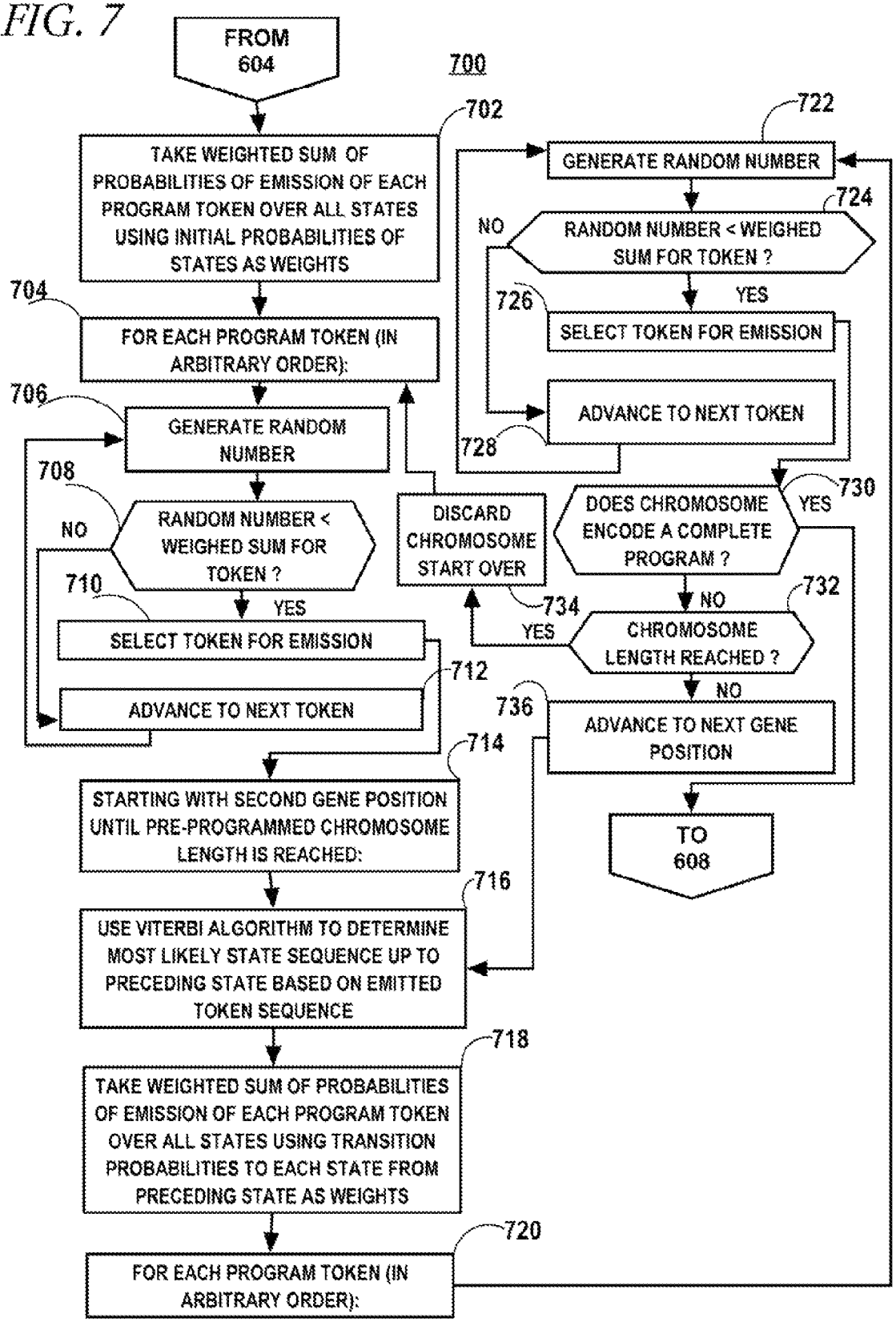
FIG. 7 is a flowchart of a sub-program for stochastically generating Gene Expression Programming chromosome observation sequences from a Hidden Markov Model.

FIG. 7 is a flowchart of a sub-program 700 for stochastically generating Gene Expression Programming chromosome observation sequences from a Hidden Markov Model. The sub-program is one alternative form of block 606 of program 600. In block 702 a weighted sum of probabilities of emission of each program token is taken over all states of the Hidden Markov Model using the initial state probabilities as weights. For each $T^{th}$ program token the weighted sum that is computed in block 702 can be expressed as:

$$\sum_{n=1}^{N} P_E(T|Sn) P_I(n)$$ EQU. 5

Block 704 is the top of first program loop that process each possible program token that can be emitted by the Hidden Markov Model. The program tokens can be selected in a random order. In block 706 a random number is generated, e.g., a random number between zero and one. Decision block 708 tests if the random number is less than the weighted sum (calculated in block 702) for the program token being processed in the current iteration of the loop commenced in block 704. If the outcome of block 708 is positive then the program token corresponding to the current iteration of the loop commenced in block 704 is selected to be the first program token emitted by the Hidden Markov Model. If on the other hand the outcome of decision block 708 is negative the sub-program 700 will branch to block 712 in which a next program token is taken up for consideration and then loop back to block 706 and proceed as previously described. Thus, the loop commenced in block 704 will continue until a program token is selected for emission. The selected token is the first gene of Gene Expression Programming chromosome that will be generated from the Hidden Markov Model by sub-program 700.

After a program token has been selected in block 710 to be the initial emission of the Hidden Markov Model, the sub-program 700 branches to block 714. Block 714 is the top of a second program loop that that generates successive genes of the Gene Expression Programming chromosome starting with the second gene position. In block 716 the Viterbi algorithm is used to determine a most likely state sequence up to a preceding cycle of the Hidden Markov Model. (Note that successive cycles or states of the HMM generate successive genes of the GEP chromosome and also correspond to iterations of the second program loop). Block 718 computes weight sums of the probabilities of program token emission over all possible current states of the Hidden Markov model using transition probabilities from the most likely preceding state as weights. For each $T^{th}$ program token the weighted sum that is computed in block 718 can be expressed as:

$$\sum_{n=1}^{N} P_E(T|Sn) P_T(n|p)$$ EQU. 6 where, p is the most likely preceding state determined in block 716.

Block 720 is the top of a third program loop that is within the second program loop. Each iteration of the third program loop addresses a different possible emitted program token. The third program loop parallels the first program loop started in block 704, but uses the weighted sums computed in block 718 instead of the weighted sums computed in block 702. Within the third program loop, in block 722 a random number e.g., between zero and one is generated, as in block 706. Next in block 724 the random number is compared to the weighted sum for the program token being considered. If the random number is above the weighted sum, then in block 728 the sub-program 700 advances to consider another possible program token and loops back to block 722. (In both block 712 and block 728 the sub-program can select another program token to be considered for emission by selecting randomly or based on an arbitrary ordering of the program tokens.) If, it is found in block 724 that the random number is less than the weighted sum for the program token under consideration then in block 726 the program token is selected for emission. The first and third program loops implement a type of roulette wheel selection.

After a program token is selected for emission in block 726, the sub-program 700 branches to decision block 730, the outcome of which depends on whether the chromosome encodes a complete program. A chromosome encoding a valid program has sufficient arguments (e.g., parameters or constants) to supply inputs for all functions. FIG. 11 described below is a flowchart of a sub-program for testing if a chromosome or portion thereof encodes a complete program. If it is determined in decision block 730 that the portion of the chromosome generated thus far in the execution of sub-program 700 does not encode a complete program, then sub-program 700 branches to decision block 732 which tests if a pre-programmed maximum chromosome length has been reached. If not, then in block 732 the sub-program is advanced to a next gene position in the chromosome being generated and then loops back to block 716 and proceeds as previously described. When block 716 is reached again the Viterbi algorithm can increase the length of the most likely state sequence by one state. If it is determined in block 732 that the pre-programmed maximum chromosome length has been reached (without chromosome encoding a valid program having been generated), then in block 732 the chromosome developed thus far is discarded and chromosome generation starts over, i.e., after block 732 the sub-program loops back to block 704.

When it is determined in block 730 that the chromosome being generated encodes a valid program, the sub-program 700 finishes and returns the chromosome to program 600 which then executes block 608.

Figure 8:
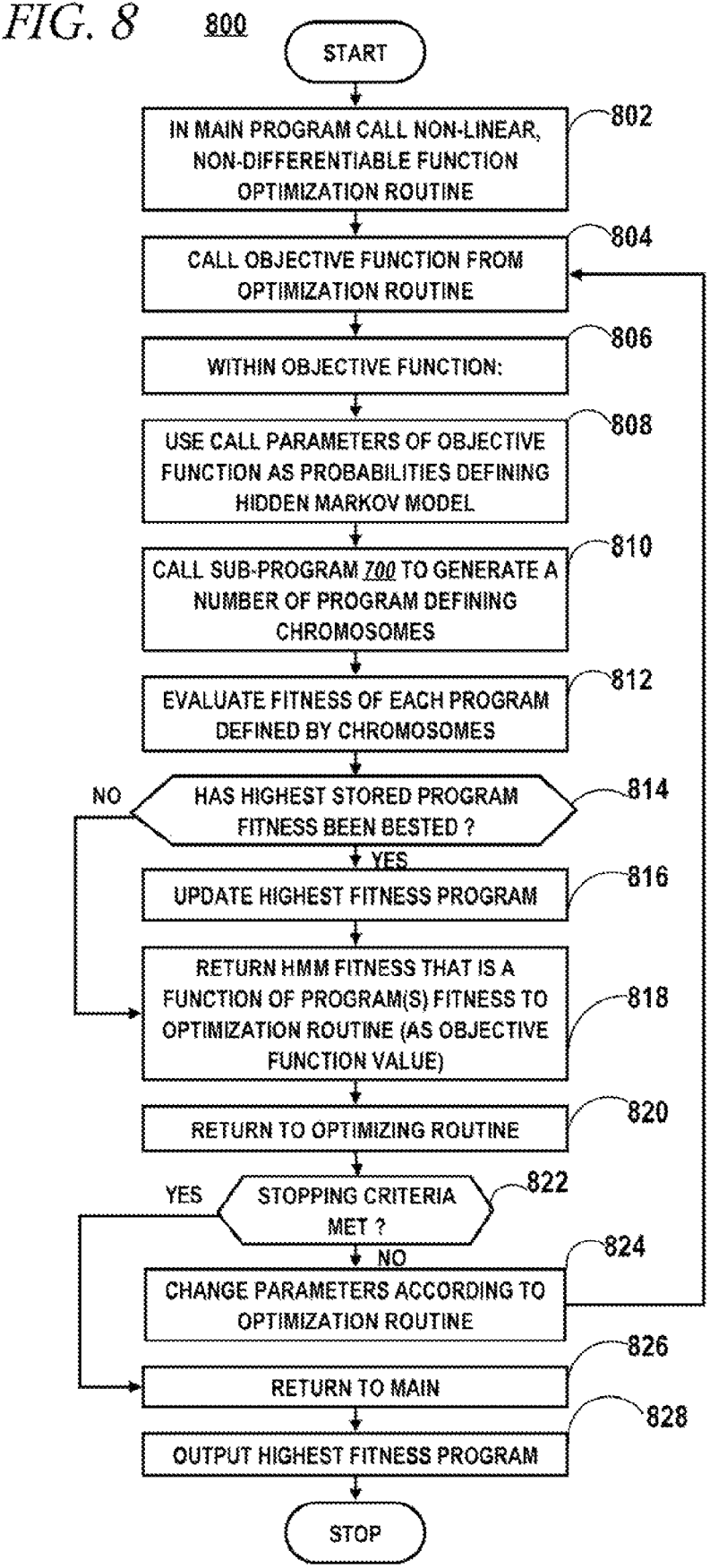
FIG. 8 is a flowchart of a second program that uses any type of non-linear, non-differentiable function optimization subroutine to optimize parameters of a Hidden Markov Model for generating Gene Expression Programming chromosomes in order to automatically generate a computer program for a particular task.

Whereas, the program 600 uses Differential Evolution to optimize a Hidden Markov Model for generating computer programs, alternatively an optimization routine other than Differential Evolution is used. FIG. 8 is a flowchart of a second program 800 that uses any type of non-linear, non-differentiable function optimization subroutine to optimize parameters of a Hidden Markov Model for generating Gene Expression Programming chromosomes in order to automatically generate a computer program for a particular task. Referring to FIG. 8, in a main program, in block 802 a non-linear, non-differentiable function optimizing routine is called. Examples of non-linear, non-differentiable function optimization routines that may be used include routines based on the Nelder-Mead algorithm, Simulated Annealing, Particle Swarm Optimization. The main program handles user interface functions and setting values of parameter, e.g. bounds, for the optimization routine, initial parameter guesses and other optimization routine specific control parameters (e.g., limit on objective function calls, stopping criteria selection). User interface aspects, e.g., can also be handled in the main program.

In block 802 control passes to the called function optimization routine. In block 804 the optimization routine calls an objective function sub-program and control passes to the objective function sub-program. Block 806 delineates the start of processing within the objective function sub-program. In block 808 parameters defining the Hidden Markov Model are set equal to the call parameters (independent variables) of the objective function. In block 810 sub-program 700 is called in order to generate a pre-programmed number (e.g., 1024) of Gene Expression Programming chromosomes using the values of the parameters defining the Hidden Markov Model that were set in block 808. In block 812 the fitness of each program (if valid) defined in each chromosome is evaluated (as in block 610). Decision block 814 tests if any of the programs generated from the Hidden Markov Model during a current call of the objective function have a fitness that exceed the best previously achieved fitness. If so, then in block 816 stored information about the highest fitness program is updated. The information stored in block 816 suitably includes a chromosome encoding the program and the fitness value for the program. If the outcome of decision block 814 is negative and in the alternative case after executing block 816, the program 800 continues with block 818 in which a Hidden Markov Model parameter fitness that is function of the fitness of one or more program generated from the Hidden Markov Model is returned to the optimization routine as the objective function value. The returned function value can be based on the maximum program fitness, an average program fitness, or a statistical function of all the program fitness values, for example. The returned function value can be the identity function of the maximum program fitness, i.e., the maximum program fitness itself. If according to the nature of the program fitness metric lower numerical values represent higher fitness (e.g., in the case of RMS error for symbolic regression programs) and the optimization routine is designed to maximize functions, then one can adapt the program fitness metric by processing it through a monotonic decreasing function. Block 820 returns control to the optimization routine.

In block 822 the optimization routine tests if a stopping criteria has been met. The stopping criteria can include an iteration limit, a measure of improvement and/or comparison of an achieved fitness value to a goal. If the stopping criteria has not been met then in block 824 the objective function call parameters (HMM parameters) are updated according to the optimization strategy of the optimization routine, and the program 800 loops back to block 804 in order to call the objective function with the updated call parameters. The optimization strategy is built in to each specific optimization routine (e.g., Nelder Mead, Simulated Annealing). If it is determined in block 822 that the stopping criteria has been met then in block 826 control is passed to the main program and in block 828 information regarding the highest fitness program is output. The information can take the form of a listing of the highest fitness program or alternatively a Gene Expression Programming chromosome encoding the program.

Figure 9:
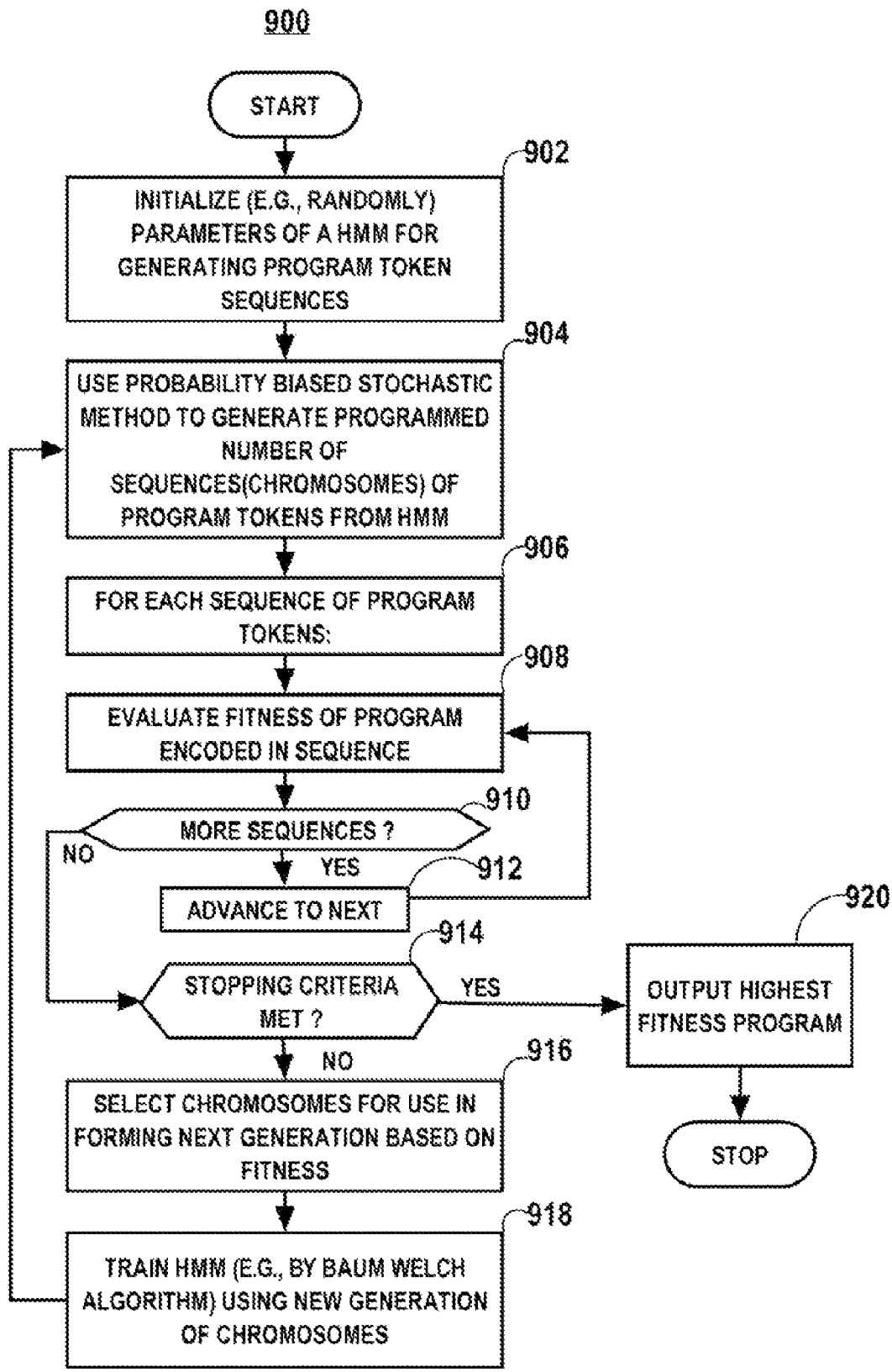
FIG. 9 is a flowchart of a third program that uses Hidden Markov Model training in combination with Gene Expression Programming methods to train a Hidden Markov Model to generate computer programs for a particular task.

FIG. 9 is a flowchart of a third program 900 that uses Hidden Markov Model training in combination with Gene Expression Programming methods to train a Hidden Markov Model to generate computer programs for a particular task. In block 902 parameters of a Hidden Markov Model for generating Gene Expression Programming chromosomes that encode programs are initialized, e.g., to random numbers between zero and one. Next in block 904 (equivalent to block 606) a probability biased stochastic method (e.g., sub-program 700) is used to generate a pre-programmed number of sequences of program tokens (chromosomes) using the Hidden Markov Model. Block 906 is the top of a program loop that is repeated for each chromosome. In block 908 the fitness of the program encoded in each chromosome is checked. After block 908, decision block 910 checks if there are more chromosomes to be processed. If so, then in block 912 the program 900 advances to a next chromosome and then loops back to block 908 to evaluate the fitness. When it is determined in block 910 that all of the chromosomes generated from the Hidden Markov Model have been checked, the program 900 branches to decision block 914 which tests if a stopping criteria has been met. If the stopping criteria has not been met the program 900 branches to block 916 in which chromosomes are replicated into a new generation with their frequency in the new generation being based, at least in part, on their fitness in the preceding population. In particular, the stochastic remainder method can be used to choose the number of each chromosome from the preceding generation that appears in the new generation. In the stochastic remainder method at least a certain number $P_i$ of copies of each $i^{th}$ chromosome are selected for replication in the next generation. The number $P_i$ is given by the following equation:

$$P_i = \operatorname{Trunc}\left(N * \frac{F_i}{\sum_{k=1}^{N} F_k}\right) \qquad \text{EQU. 7}$$

where, N is the number of population members in each generation; Fi is the fitness of the $i^{th}$ population member; and Trunc is the truncation function.

The sum in the denominator of the preceding equation is taken over the entire current population. The fractional part of the quantity within the truncation function in preceding equation is used to determine if any additional copies of each population member (beyond the number $P_i$ of copies determined by EQU. 7) will be replicated in the next generation. The aforementioned fractional part is used as follows. The fractional parts for the population members are used in succession. For each fractional part, a random number between zero and one is generated. If the fractional part exceeds the random number then an additional copy of the population member associated with the fractional part is added to the next generation. The number of selections made using random numbers and the fractional parts is adjusted so that successive populations maintain the total number of members N. Using the above described stochastic remainder method leads to selection of population members for replication based largely on fitness, yet with a degree of randomness. The latter characteristics echo natural selection in biological systems.

Next in block 918 the selected fraction of chromosomes is processed with a Hidden Markov Model training algorithm, for example the Baum Welch algorithm in order to train the Hidden Markov Model according to the relatively higher fitness fraction of the chromosomes. After, block 918 the program 900 loops back to block 904 and continues processing as previously described.

When it is determined in block 916 that the stopping criteria has been met, the program 900 branches to block 920 in which the highest fitness program is output.

Figure 10:
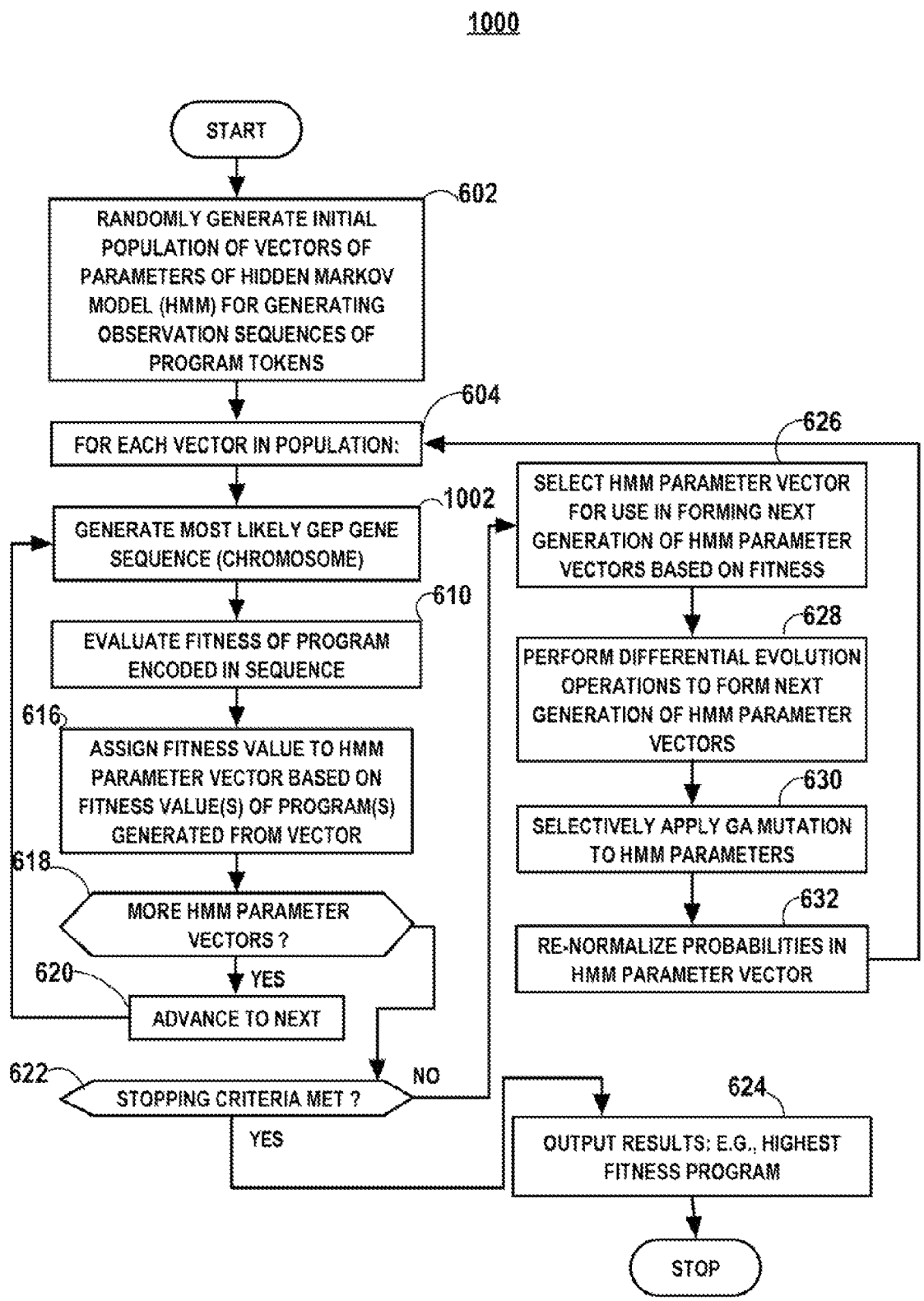
FIG. 10 is a flowchart of a fourth program that uses Differential Evolution to evolve parameters of a Hidden Markov Model for generating Gene Expression Programming chromosomes in order to automatically generate a computer program for a particular task.

FIG. 10 is a flowchart of a fourth program 1000 that uses Differential Evolution to evolve parameters of a Hidden Markov Model for generating Gene Expression Programming chromosomes in order to automatically generate a computer program for a particular task. The fourth program 1000 is a variation on the first program 600. In the fourth program 1000 rather than executing block 606 (e.g., sub-program 700) to generate multiple program token sequences (GEP chromosomes) from using each set of Hidden Markov Model parameters, the fourth program 1000 executes block 1002 in which a single most likely program token sequence is generated for each set of Hidden Markov Model parameters. Consequently, blocks 608, 612, 614 of the first program 600 are not part of the fourth program 1000. In the fourth program if the most likely gene sequence does not encode a valid program the HMM parameter vector used to generate the gene sequence is assigned a very low fitness value, e.g., a pre-programmed low fitness value. Sub-program 1100 can be used to determine if a chromosome encodes a valid computer program.

FIG. 11 is a flowchart of a sub-program 1100 for checking if a Gene Expression Programming chromosome or portion of a chromosome encodes a complete, valid program. The sub-program is disclosed in co-pending patent application Ser. No. 11/073828 (CML01862T) entitled "Gene Expression Programming With Enhanced Preservation Of Attributes Contributing To Fitness" to Chi Zhou et al which is assigned in common with the present invention. Invalid chromosomes may sometimes be generated by a Hidden Markov Model. Certain parts of the sub-program 1100 apply to checking entire chromosomes but are superfluous for checking sub-tree portions of chromosomes. In addition to being used in sub-program 1000, sub-program 1100 can be used to implement block 730 of sub-program 700. In block 1102 the length of a chromosome or portion of a chromosome to be checked by the sub-program is read and set equal to a variable MAX. When used in sub-program 730 MAX will be set equal to the number of chromosome elements generated up to the point that block 730 is reached. In block 1104 a gene position pointer is set to zero, which refers to the first gene of the chromosome array. In block 1106 a variable 'rGeneNo' is initialized to one. The variable rGeneNo indicates a number of additional genes required to complete a tree or sub-tree encoding portion of a chromosome. As the sub-program 1100 processes successive genes in a chromosome, the value of rGeneNo varies to reflect the number of appearances of the terminal genes (e.g., constants, variables) required to provide enough input signals for all function genes up to the current ($i^{th}$) gene position.

Block 1108 is the start of a program loop that is repeated until rGeneNo=0 (which happens when the end of an expression encoding portion of a chromosome or the end of a sub-tree has been reached) or until i=MAX (which happens when the end of the portion of the chromosome being checked has been reached. If the end of the chromosome is reached without passing enough terminal genes to provide inputs for all function genes that have been encountered, an incomplete and therefore invalid program is encoded in the chromosome.) In each pass through the program loop, in block 1110, the rGeneNo variable is incremented by one less than the arity of the program function represented by the $i^{th}$ gene, and in block 1112 the index i that points to successive genes is incremented by 1. Block 1114 denotes the bottom of the program loop. Block 1116 is a decision block, the outcome of which depends on whether, after the program loop has been exited, the value of the variable rGeneNo is greater than zero. A value greater than zero, indicates that more terminal genes, than are present in the portion of chromosome processed, would be necessary to provide inputs for all of the signal processing element genes present in the portion of the chromosome. If it is determined in block 1116 that the value of rGeneNo is greater than zero, the sub-program 1100 proceeds to block 1118 in which an invalid chromosome indication is returned. If on the other hand, it is determined in block 1116 that rGeneNo is equal to zero, then the routine branches to block 1120 in which the value of the index i is returned along with a valid chromosome indication. The value of the index I is the length (number of genes) of the program encoding portion of the chromosome that was processed by the sub-program 1100 or the length of a sub-tree encoding portion of the chromosome. For determining the length of sub-tree encoding portions of known valid chromosomes decision block 1116 is superfluous, as the sub-program 1100 will always report the length of the sub-tree encoding portion. Alternatively, for determining the length of sub-trees I can be initialized to the position of the root of the sub-tree in the full chromosome array, and in block 1120 the final value of I can be reported back as the last gene in the sub-tree encoding portion of the full chromosome.

Table III below illustrates the operation of the sub-program for the chromosome shown in FIG. 1 augmented with an additional superfluous sequence of genes "3,X,5".

| Part of Chromosome to be processed | I | Current Gene | Required Operands | RGeneNo |
|---|---|---|---|---|
| sqrt.*.+.y.*.x.5.*.sqrt./.1.−.x.y.x.3.x.5 | 0 | sqrt | 1 | 1 |
| *.+.y.*.x.5.*.sqrt./.1.−.x.y.x.3.x.5 | 1 | * | 2 | 2 |
| +.y.*.x.5.*.sqrt./.1.−.x.y.x.3.x.5 | 2 | + | 2 | 3 |
| y.*.x.5.*.sqrt./.1.−.x.y.x.3.x.5 | 3 | y | 0 | 2 |
| *.x.5.*.sqrt./.1.−.x.y.x.3.x.5 | 4 | * | 2 | 3 |
| x.5.*.sqrt./.1.−.x.y.x.3.x.5 | 5 | x | 0 | 2 |
| 5.*.sqrt./.1.−.x.y.x.3.x.5 | 6 | 5 | 0 | 1 |
| *.sqrt./.1.−.x.y.x.3.x.5 | 7 | * | 2 | 2 |
| sqrt./.1.−.x.y.x.3.x.5 | 8 | sqrt | 1 | 2 |
| /.1.−.x.y.x.3.x.5 | 9 | / | 2 | 3 |
| 1.−.x.y.x.3.x.5 | 10 | 1 | 0 | 2 |
| −.x.y.x.3.x.5 | 11 | − | 2 | 3 |
| x.y.x.3.x.5 | 12 | x | 0 | 2 |
| y.x.3.x.5 | 13 | y | 0 | 1 |
| x.3.x.5 | 14 | x | 0 | 0 |

In Table III the first column shows a portion of the chromosome 100 to be processed at the beginning of the program loop commenced in block 1108, the second column indicates the value of the i variable at the start of the program loop, the third column shows the gene in the $i^{th}$ position, the fourth column shows required operands for the $i^{th}$ gene, and the fifth column shows the value of the rGeneNo variable after executing block 1110 of the program loop. The example in Table III assumes a maximum chromosome length of 18 genes. The expression encoding portion of the exemplary chromosome is 15 genes long, extending from gene position 0 to gene position 14. When the gene 14 is reached the variable rGeneNo attains a value of zero and the program loop (blocks 1108-1114) is exited, whereupon the routine executes decision block 1116. Note that in the interest of program efficiency the steps of sub-program 1100 can be incorporated into sub-program 700.

FIG. 12 is a flowchart of a sub-program 1200 for decoding chromosome arrays such as shown in FIG. 1. Decoding implicitly determines a tree structure from a chromosome array by determining all of the parent-child relationships between genes in the chromosome array. Decoding is useful in interpreting computer programs that are efficiently encoded in the form of chromosomes. Note that the sub-program 1200 is a recursive sub-program that calls itself to handle each sub-tree of the tree represented in a chromosome. When the sub-program 1200 is initially invoked it receives a full chromosome, when sub-program 1200 calls itself recursively it receives a portion of the full chromosome that encodes a sub-tree representing a portion of a program (or other thing encoded in the chromosome). As indicated in block 1202 the sub-program 1200 starts with the root gene of the chromosome. When the program is called by itself it starts in block 1202 with the first gene of a portion the chromosome representing a sub-tree. In block 1204 the total number of children is set based on the arity of the element coded by the root gene. The arity or each element is pre-programmed and may be stored in a table (e.g., a computer readable form of Table I and 11). Block 1206 is a decision block the outcome of which depends on whether the root gene codes a terminal. A terminal is, for example, a constant, a variable or a signal input. A tree that has a terminal at the root is degenerate but may arise in certain instances. If the root is a terminal the sub-program 1200 terminates. On the other hand if the root is not a terminal the sub-program 1200 proceeds to block 1208, in which a children counter for the root node is initialized (e.g., with a value of one) to refer to the first child. Next in block 1210 a gene pointer that takes on integer values referring to gene positions in the chromosome array is set to a value pointing to the first child of the root node, which immediately follows the root gene in the chromosome array. In block 1212 the first child is associated with the root. In an object-oriented implementation of the sub-program 1200 the association of the root node and its children nodes can be stored by assigning a reference to the child node to the root node. Alternatively, parent-child associations can be stored in a children array for each node, where each $k^{th}$ element of the children array for a $k^{th}$ child includes an integer index indicating the position of the child in the chromosome array. In block 1214 the sub-program 1100 is called to determine the length (number of genes) of the sub-tree rooted by the current child. (When block 1214 is reached the first time within sub-program 1200, the current child is the first child.) The sub-routine 1100 can be called with a portion of the chromosome array starting with the current child. Note that the sub-program used in block 1214 determines the sub-tree without the benefit of a previously established tree such as shown in FIG. 2. The sub-program 1200 only uses the linear chromosome representation. After block 1214, in block 1216 the portion of the chromosome array (e.g., 1200) that encodes the sub-tree is selected, and in block 1218 the sub-program 1200 recursively calls itself with the selected sub-tree. Block 1220 is a decision block, the outcome of which depends on whether the root node has more children. Recall that the total number of children was set in block 1204 based on the arity of the root node. If there are no more children, the sub-program 1200 terminates. On the other hand, if there are more children, then in block 1222 the children counter that was initialized in block 1208 is incremented to the next child, and in block 1224 the gene pointer is set to point to the next child which follows the sequence of genes encoding the sub-tree rooted in the preceding child. Block 1224 uses the length of the sub-tree determined in block 1214. In block 1226 the child identified by the children counter and the gene pointer is associated with the root as another child of the root. Thereafter, the sub-program 1200 loops back to block 1214.

Once the parent-child relationships embodied in a chromosome have been determined by sub-program 1200 they can be used to evaluate the output of a program encoded in the chromosome that is produced in response to input. Evaluating the fitness of programs encoded in chromosomes involves applying training data input to programs encoded in chromosomes and comparing the output produced in response to the training data input to a priori known output that is part of the training data.

FIG. 13 is a flowchart of a sub-program 1300 for evaluating the output of a program encoded in a chromosome that is produced in response to input. The sub-program 1300 starts in block 1302 at the root of a tree representation of a program encoded in a chromosome and calls itself recursively to handle each sub-tree in the program encoded in the chromosome. Decision block 1304 tests if the root gene (of the tree representation e.g., FIG. 2 or sub-tree in a recursive call) is a terminal. Terminals include independent variables, constants (e.g., biases, gains), or signal inputs. If the gene is a terminal then in block 1304 its numerical value is returned by the sub-program 1300. Typically, except for the case of a chromosome encoding a degenerate tree that includes a terminal in the root position, the numerical value will be returned to an instance of the sub-program 1300 that invoked the sub-program 1300. If it is determined in decision block 1304 that the root is not a terminal, then the sub-program 1300 branches to block 1308 which starts a loop that process each child of the root. The children of each gene encoded in a chromosome are identified by sub-program 1200. Within the loop, decision block 1310 tests if a child gene currently being processed is a terminal. If so, then in block 1312 a value for the child gene is set to a value of the terminal (e.g., constant, input signal, independent variable value). If, on the other hand, the child gene being processed is not a terminal (e.g., it is a function) then in block 1314 the sub-program 1300 calls itself to process the sub-tree rooted in the child gene being processed. Sub-program 1100 can be used to identify a portion of the chromosome that encodes the sub-tree rooted in the child gene. After block 1312 or block 1314 is executed, the sub-program 1300 reaches decision block 1316, the outcome of which depends on whether there are more children to be processed. If so, then in block 1318 the sub-program 1300 is advance to a next child and then loops back to decision block 1310 and continues executing as previously described. When it is determined in block 1320 that there are no more children to be processed, then the sub-program branches to block 1320 which uses the values of the children genes (either the value of terminal type children genes or the output sub-trees rooted in children genes) to compute the output of the function encoded in the root gene. (Recall that if the root gene is a terminal its value is returned in block 1306) In block 1322 the output of the function encoded in the root gene is returned.

The programs and sub-programs described above can alternatively be applied to automatically design electronic circuits. To do so rather than using the Hidden Markov Models to emit program tokens, the Hidden Markov Models are used to emit circuit elements or entire circuit blocks. Co-pending patent application Ser. No. 11/554,734 filed Oct. 31, 2006 by Magdi Mohamed et al., which is hereby incorporated herein by reference, discloses the design of networks of configurable infinite logic processing nodes by Gene Express Programming. The programs and sub-programs described hereinabove can also be used to design such networks of configurable infinite logic processing nodes.

Figure 14:
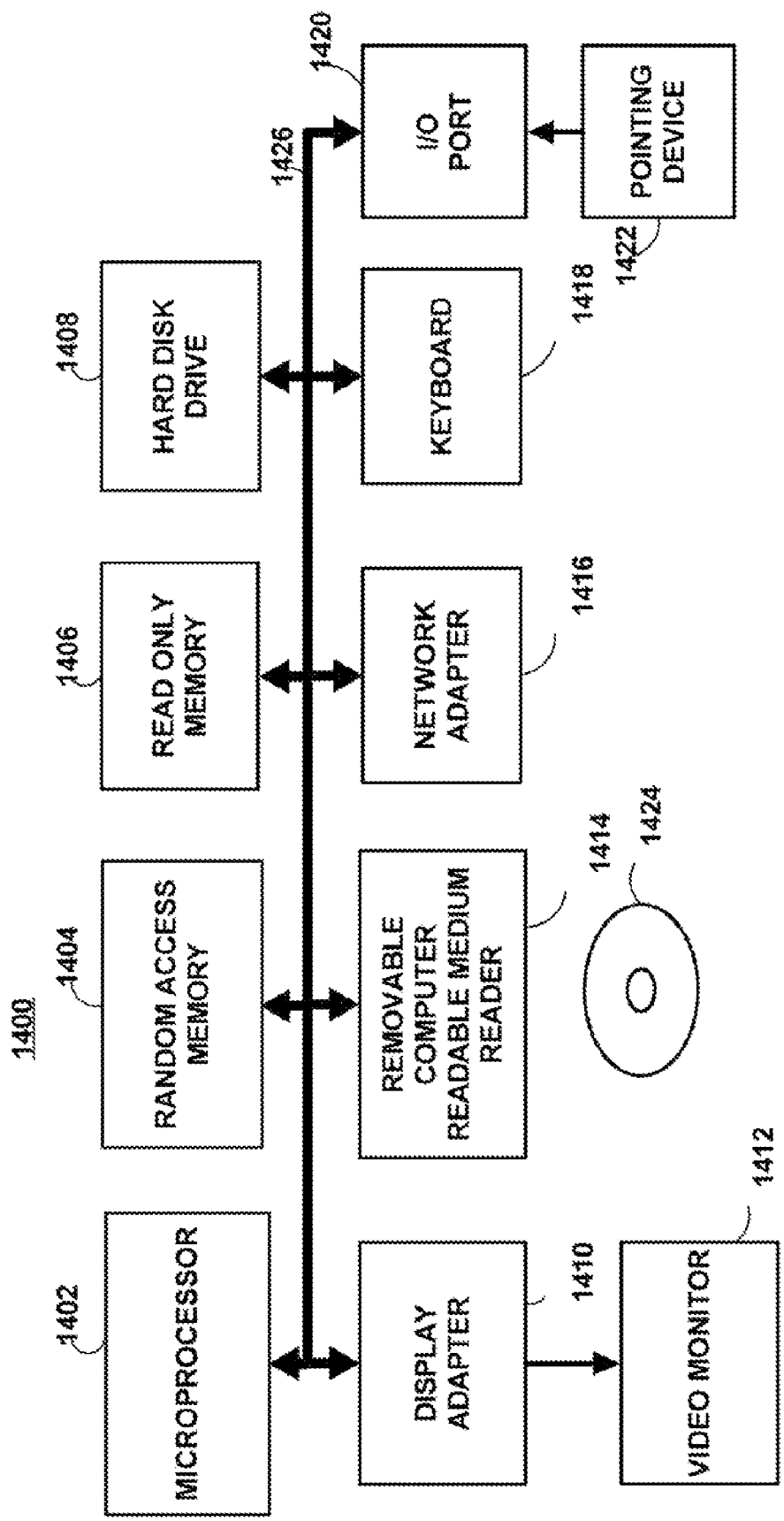
FIG. 14 is a block diagram of a computer that can be used to execute programs described with reference to FIGS. 6-10.

FIG. 14 is a block diagram of a computer that can be used to execute programs described with reference to FIGS. 6-10. The computer 1400 comprises a microprocessor 1402, Random Access Memory (RAM) 1404, Read Only Memory (ROM) 1406, hard disk drive 1408, display adapter 1410, e.g., a video card, a removable computer readable medium reader 1414, a network adaptor 1416, keyboard 1418, and I/O port 1420 communicatively coupled through a digital signal bus 1426. A video monitor 1412 is electrically coupled to the display adapter 1410 for receiving a video signal. A pointing device 1422, suitably a mouse, is coupled to the I/O port 1420 for receiving signals generated by user operation of the pointing device 1422. The network adapter 1416 can be used, to communicatively couple the computer to an external source of data, e.g., a remote server. A computer readable medium 1424, that includes software embodying the programs and sub-programs described above with reference to FIGS. 6, 7, 8, 9, 10 is provided. The software included on the computer readable medium 1424 is loaded through the removable computer readable medium reader 1414 in order to configure the computer 1400 to carry out programs and sub-programs of the current invention that are described above with reference to the FIGS. 6, 7, 8, 9, 10. The programs and sub-programs are executed by the microprocessor 1402. The computer 1400 may for example comprise a personal computer or a work station computer. A variety of types of computer readably medium including, by way of example, optical, magnetic, or semiconductor memory are alternatively used to store the programs, sub-programs and data-structures described above. The computer readable medium 1424 may be remote from the computer 1400 and accessed through a network. It will be apparent to one of ordinary skill in the programming art that the programs may be varied from what is described above.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A computer readable medium storing a computer program for automatically generating a problem solution, the computer program including program code for:

generating an initial population of vectors of numerical parameters wherein each vector in the initial population includes initial state probabilities, state-to-state transition probabilities and solution token emission probabilities for a Hidden Markov Model for generating problem solutions;

for each of a succession of generations recursively derived from said initial population until a stopping criteria is met:

using each vector in a current generation to stochastically generate a plurality of evolutionary programming chromosomes each of which encodes a potential problem solution;

evaluating a solution fitness of each potential problem solution encoded in each chromosome;

ascribing a vector fitness to each particular vector based on at least one solution fitness associated with at least one potential problem solution generated from said particular vector;

selecting at least one vector for use in forming a successive generation of vectors based on said vector fitness;

performing evolutionary operations on vectors in said current generation in order to form a next generation of vectors; and when said stopping criteria has been met outputting information generated by the computer program.

2. A computer readable medium storing a first computer program automatically generating other computer programs, the first computer program including instructions for:

generating an initial population of vectors of numerical parameters wherein each vector in the initial population includes initial state probabilities, state-to-state transition probabilities and program token emission probabilities for a Hidden Markov Model for generating computer programs;

for each of a succession of generations recursively derived from said initial population until a stopping criteria is met:

using each vector in a current generation to generate at least one evolutionary programming chromosomes which encodes at least one_computer program;

evaluating a program fitness of said at least one computer program encoded in said at least one chromosome;

ascribing a vector fitness to each particular vector based on at least one program fitness associated with said at least one computer program generated from said particular vector;

selecting at least one vector for use in forming a successive generation of vectors based on said vector fitness;

performing evolutionary operations on vectors in each current generation in order to form a next generation of vectors; and when said stopping criteria has been met outputting information generated by the first computer program.

3. The computer readable medium according to claim 2 wherein the instructions for using each vector to generate at least one evolutionary programming chromosome comprise instructions for:

stochastically generating a plurality of gene expression programming chromosomes which encode computer programs.

4. The computer readable medium according to claim 3 wherein the instructions for stochastically generating each of the plurality of gene expression programming chromosomes comprise instructions for:

for each program token that can be emitted by the Hidden Markov Model computing a weighted sum of program token emission probabilities across a plurality of Hidden Markov Model states, wherein for an initial state initial state probabilities are used as weights in the weighted sum, and wherein for states following the initial state state-to-state transition probabilities are used as weights in the weighted sum;

using a roulette wheel selection to select an emitted program token, wherein said weighted sum is used as a limit that must exceed a randomly generated number for a token associated with said weighted sum to be emitted.

5. The computer readable medium according to claim 2 wherein the instructions for outputting information generated by the first program comprise instructions for: outputting a highest fitness program.

6. The computer readable medium according to claim 2 wherein the instructions for performing evolutionary operations on vectors in said current generation in order to form said next generation of vectors comprise instructions for performing Differential Evolution operations.

7. The computer readable medium according to claim 2 wherein the instruction for performing evolutionary operations on vectors in said current generation in order to form said next generation of vectors comprise instructions for performing Genetic Algorithm mutation.

8. A computer readable medium storing a first computer program for automatically generating a second computer program, the first program including instructions for:

calling a non-linear, non-differentiable function optimization computer program to optimize parameters of an objective function that includes a Hidden Markov Model for generating a sequence of gene expression programming genes, and wherein said parameters include initial state probabilities, state-to-state transition probabilities, and emission probabilities for said Hidden Markov Model;

wherein said function optimization computer program calls said objective function and wherein said objective function includes program instructions for:

generating at least one sequence of Gene Expression Programming genes from said Hidden Markov Model;

if said at least one sequence of genes encodes a valid program, evaluating a measure of fitness of said valid program;

returning a function of said measure of fitness to said function optimization computer program.

9. The computer readable medium according to claim 8 wherein said function of said measure of fitness is the identity function.

10. The computer readable medium according to claim 8 wherein the program instructions for generating at least one sequence of gene expression programming genes comprise program instructions for generating a plurality of sequences of gene expression programming genes; and wherein said function of said measure of fitness is a function of a plurality of measures of fitness of a plurality of programs encoded in said plurality of sequences of Gene Expression Programming genes.

11. The computer readable medium according to claim 8 wherein said function of said measure of fitness is an extremum function of said plurality of measures of fitness.

12. A computer readable medium storing a first program for automatically generating a second computer program, the first program comprising instructions for:

initializing parameters of a Hidden Markov Model for generating computer programs wherein said parameters include initial state probabilities, state-to-state transition probabilities and program token emission probabilities;

for each of a succession of generations of gene expression programming chromosomes until a stopping criteria is met:

using said Hidden Markov model to stochastically generate a current population of gene expression programming chromosomes each of which encodes a computer program;

evaluating a program fitness of each computer program encoded in each chromosome;

copying chromosomes into a next generation with frequencies of said chromosomes in said next generation based on said program fitness of each computer program encoded in each chromosome;

training said Hidden Markov Model according to said next generation in order to determine new parameters for said Hidden Markov Model;

when said stopping criteria has been met outputting information generated by the first program.

13. The computer readable medium according to claim 12 wherein said instructions for training said Hidden Markov Model according to said next generation in order to determine new parameters for said Hidden Markov Model comprises instructions for executing the Baum-Welch algorithm.

14. The computer readable medium according to claim 12 wherein the instructions for outputting information generated by the first program comprise instructions for outputting a highest fitness program.

15. A computer for automatically generating a problem solution, the computer comprising a memory storing software and a microprocessor coupled to the memory, wherein the microprocessor is programmed by the software to:

generate an initial population of vectors of numerical parameters wherein each vector in the initial population includes initial state probabilities, state-to-state transition probabilities and solution token emission probabilities for a Hidden Markov Model for generating chromosomes encoding potential problem solutions;

for each of a succession of generations recursively derived from said initial population until a stopping criteria is met:

use each vector in a current generation to stochastically generate a plurality of evolutionary programming chromosomes each of which encodes a potential problem solution;

evaluate a solution fitness of each potential problem solution encoded in each chromosome;

ascribe a vector fitness to each particular vector based on at least one solution fitness associated with at least one potential problem solution generated from said particular vector;

select at least one vector for use in forming a successive generation of vectors based on said vector fitness;

perform evolutionary operations on vectors in said current generation in order to form a next generation of vectors; and when said stopping criteria has been met output information generated by the computer program.

* * * * *

UNITED STATES PATENT AND TRADEMARK OFFICE
CERTIFICATE OF CORRECTION

PATENT NO. : 7,725,409 B2  
APPLICATION NO. : 11/758083  
DATED : May 25, 2010  
INVENTOR(S) : Zhou et al.

Page 1 of 1

It is certified that error appears in the above-identified patent and that said Letters Patent is hereby corrected as shown below:

In Column 15, Line 56, delete "11)." and insert -- II). --, therefor.

Signed and Sealed this
Fourteenth Day of August, 2012

David J. Kappos
*Director of the United States Patent and Trademark Office*